W. MOREHOUSE.
Corn-Planter.

No 20,656.

Patented June 22, 1858.

ns of the frame A, the back ends of

UNITED STATES PATENT OFFICE.

W. MOREHOUSE, OF DAVENPORT, IOWA.

IMPROVEMENT IN SEEDING-MACHINES.

Specification forming part of Letters Patent No. 20,656, dated June 22, 1858.

*To all whom it may concern:*

Be it known that I, W. MOREHOUSE, of Davenport, in the county of Scott and State of Iowa, have invented a new and Improved Seeding-Machine; and I do hereby declare that the following is a full, clear, and exact description of the same, reference being had to the annexed drawings, making a part of this specification, in which—

Figure 1:
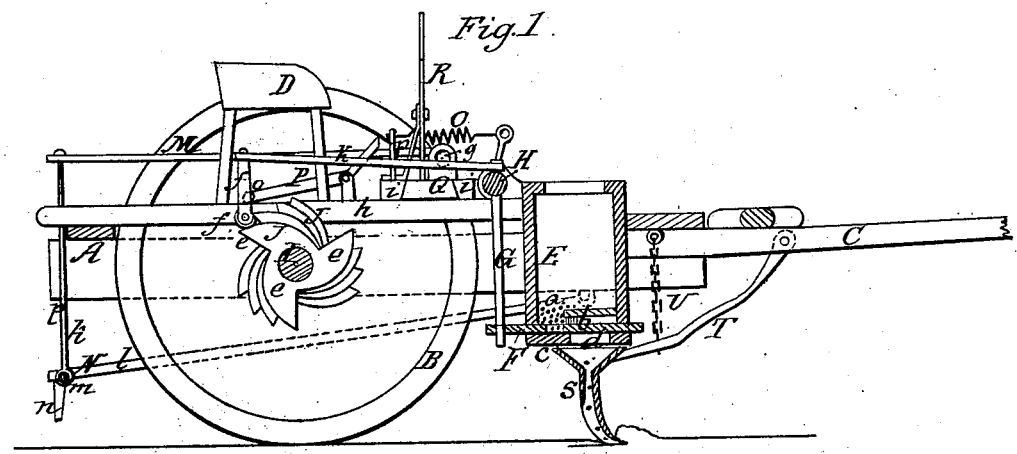
Figure 2:
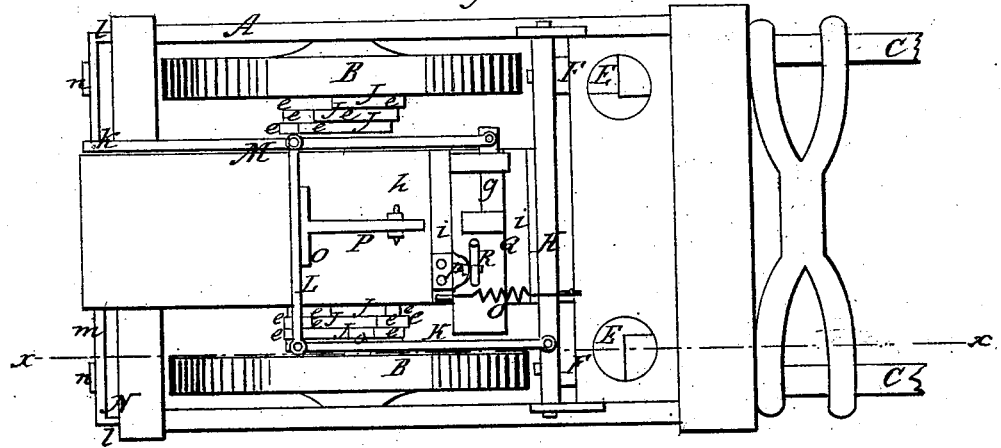

Figure 1 is a side sectional elevation of my improvement, taken in the line $x\,x$, Fig. 2. Fig. 2 is a plan or top view of the same.

Similar letters of reference indicate corresponding parts in the two figures.

This invention relates to an improvement in that class of seeding-machines by which seed is planted in hills and in check-rows, two rows being planted at the same time.

The invention consists in a novel means employed for operating reciprocating seed-slides and markers, as hereinafter fully shown and described, whereby the distribution or dropping of the seed is placed entirely under the control of the driver, and consequently the even or uniform planting of the same is assured.

To enable those skilled in the art to fully understand and construct my invention, I will proceed to describe it.

A represents a horizontal frame, which is mounted on wheels B B.

C are thills attached to the front end of the frame A.

D is the driver's seat, placed on the frame A.

E E are two seed-boxes, which are fitted in the front end of frame A.

At or over the bottom of each seed-box E a slide, F, is placed, each slide having a hole, $a$, made in it and working below a cut-off, $b$, which may be formed of brushes. (See Fig. 1.)

The bottoms $c$ of the hopper have each a hole, $d$, made through them, as shown clearly in Fig. 1.

The back end of each slide F is attached to a rod, G, and the upper ends of these rods are attached to a shaft, H.

On the axle I of the wheels B B a series of cams, J, are placed at each end, any proper number being used. These cams are all of the same form, having three arms or projections, $e$; but they are placed in varying positions on the axle, as shown clearly in Fig. 1, one being placed slightly in advance of the other, and all at equal distances apart.

To the shaft H the front end of a rod, K, is pivoted. The back end of this rod is bent downward at a right angle with its other portion, as shown at $f$, and has a friction-roller, $f'$, placed in its lower end.

To the back end of the rod K one end of a cross-rod, L, is attached, and the opposite end of this rod is attached to a rod, M, the front end of which is pivoted to a small shaft, $g$, attached to a platform, $h$, on the frame $a$. The rod M has a pendent projection attached to it at about its center, and a friction-roller is fitted in its lower end, corresponding precisely with the pendant $f$ and rollers $f'$. The rod M extends to the back end of the frame A, and it is connected by a rod, $k$, with a frame, N, the front end of which is jointed to the front end of frame A.

The frame N is formed of two rods, $l\,l$, one at each side of the frame A, the back ends of the rods $l$ being connected by a cross-rod, $m$. To the rod $m$ two spade-like projections, $n\,n$, are attached, said projections being in line with the seed-boxes E E.

O is a spiral spring, one end of which is attached to the shaft H, and the other end of the spring is attached to the platform $h$.

P is a lever which is placed on the platform $h$. This lever has a cross-bar, $o$, at its back end, said bar $o$ being directly underneath the cross-rod L.

The shaft $g$ has its bearings attached to a sliding plate, Q, which is fitted between guides $i\,i$, placed transversely on the platform $h$, and an upright lever, R, which is pivoted to an upright, $p$, on the platform, has its lower end attached to the sliding plate Q.

S S are seed-conveying tubes, which are placed one under each seed-box E. Each tube S is attached to an arm, T, and the front ends of these arms are pivoted to the thills C. A chain, U, is also attached to each arm T, the upper ends of the chains being attached to the thills C or frame A.

The operation is as follows: As the machine is drawn along the cams J and spring O actuate the shaft H, and the shaft operates the slides F through the medium of the rods G.

The seed is discharged from the seed-boxes E by the perforated slides F in the usual way, and the tubes S convey the same to the earth, the tubes being allowed to rise and fall to correspond to the inequalities of the ground. The slides F may be stopped at any time by merely placing the foot on the front end of lever P and depressing it, thereby raising the rods K M free from the cams J, and the dropping of the seed at certain points at variance with a regular movement may be attained by shifting the slide Q, and thereby moving the friction-rollers that bear upon the cams upon such cam that will produce the result, it being understood that the cams are placed on the axle in varying positions, and therefore by shifting the rods M K the dropping of the seed may be retarded or accelerated, as occasion may require. This lateral moving or shifting of the rods M K is performed by actuating the lever R by hand, while the rods are raised free from the cams by the foot of the driver on seat D. Simultaneously with the movement of the slides F and the dropping of the seed the projections n n are allowed to fall. These projections serve as markers, and designate the planted seed, and enable the driver to place or adjust the machine properly in commencing rows, and also to keep the rows even or at equal distances apart.

I am aware that markers have been previously used and arranged similar to the ones herein described. I therefore do not claim the markers, separately considered; nor do I claim the reciprocating seed-slides F, nor the seed-conveying tubes S, for they also have been used; but,

Having thus described my invention, what I claim as new, and desire to secure by Letters Patent, is—

1. The cams J, attached to the axle I, and laterally-moving rods K M, attached respectively to the shafts H $g$, the seed-slides F, being attached to the shaft H by rods G, and the shaft $g$, being attached to a slide-plate, Q, the above parts operating as and for the purpose set forth.

2. The markers $n$, attached to the frame N, when said markers are used in connection with the cams J and rods M K for operating the seed-distributing device, and the whole arranged to operate as and for the purpose set forth.

WM. MOREHOUSE.

Witnesses:
C. G. BLOOD,
H. S. SLAYMAKER.